United States Patent
Nakadai et al.

(10) Patent No.: US 11,594,238 B2
(45) Date of Patent: *Feb. 28, 2023

(54) ACOUSTIC SIGNAL PROCESSING DEVICE, ACOUSTIC SIGNAL PROCESSING METHOD, AND PROGRAM FOR DETERMINING A STEERING COEFFICIENT WHICH DEPENDS ON ANGLE BETWEEN SOUND SOURCE AND MICROPHONE

(71) Applicant: HONDA MOTOR CO., LTD., Tokyo (JP)

(72) Inventors: Kazuhiro Nakadai, Wako (JP); Hirofumi Nakajima, Tokorozawa (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

This patent is subject to a terminal disclaimer.

(21) Appl. No.: 16/810,288

(22) Filed: Mar. 5, 2020

(65) Prior Publication Data

US 2020/0294520 A1 Sep. 17, 2020

(30) Foreign Application Priority Data

Mar. 15, 2019 (JP) .............................. JP2019-048406

(51) Int. Cl.
*G10L 21/00* (2013.01)
*G06F 17/16* (2006.01)
(Continued)

(52) U.S. Cl.
CPC .............. *G10L 21/00* (2013.01); *G06F 17/14* (2013.01); *G06F 17/16* (2013.01)

(58) Field of Classification Search
CPC ......... G10L 21/00; G06F 17/16; G06F 17/14; H04H 20/89; H04S 7/30
(Continued)

(56) References Cited

U.S. PATENT DOCUMENTS 9,955,277 B1 * 4/2018 Alexandridis ............ H04S 7/30
2011/0019835 A1 1/2011 Schmidt et al.
(Continued)

FOREIGN PATENT DOCUMENTS

JP 2008-141593 6/2008
JP 2010-171785 A 8/2010
(Continued)

OTHER PUBLICATIONS

U.S. Office Action dated Oct. 29, 2020, U.S. Appl. No. 16/809,053, 9 pages.
(Continued)

*Primary Examiner* — Farzad Kazeminezhad
(74) *Attorney, Agent, or Firm* — Rankin, Hill & Clark LLP

(57) ABSTRACT

An acoustic signal processing device calculates a signal waveform that a microphone receives when at least one of a sound source and the microphone is moving. The acoustic signal processing device includes a coefficient calculation unit configured to model a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more, and a recording signal calculation unit configured to calculate the signal waveform that the microphone receives using the modeled steering coefficient $g_{k,m}$.

5 Claims, 6 Drawing Sheets

(51) Int. Cl.
G06F 17/14 (2006.01)
H04H 20/89 (2008.01)
H04S 5/00 (2006.01)

(58) Field of Classification Search
USPC ............................................. 381/303
See application file for complete search history.

(56) References Cited

U.S. PATENT DOCUMENTS

2015/0085615 A1 3/2015 Perrin et al.
2015/0312678 A1* 10/2015 Kruger ............... H04H 20/89
381/303

FOREIGN PATENT DOCUMENTS

| JP | 2013-545382 A | 12/2013 |
| JP | 2014-056181 | 3/2014 |
| JP | 2016-122430 A | 7/2016 |
| JP | 2017-078934 A | 4/2017 |
| JP | 2017-079017 A | 4/2017 |
| WO | 2012/055940 A1 | 5/2012 |

OTHER PUBLICATIONS

U.S. Notice of Allowance dated Feb. 8, 2021, U.S. Appl. No. 16/809,053, 5 pages.
Japanese Office Action dated Oct. 4, 2022, English translation included, 5 pages.
Anonymous, "Founer senes," Wikipedia, online (Oct. 4, 2018) url=https://ja.wikipedia.org/w/index.php?title=%E3%83%95%E3%83%BC%E3%83%AA%E3%82%A8%E7%B4%9A%E6%95%B0&oldid=70155272, Oct. 4, 2018, URL, https://ja.wikipedia.org/w/index.php?title=%E3%83%95%E3%83%BC%E3%83%AA%E3%82%A8%E7%B4%9A%E6%95%BQ&oldid=70155272.
Emily Denton, et.al., "Exploiting Linear Structure Within Convolutional Networks for Efficient Evaluation", Computer Vision and Pattern Recognition (cs. CV); Machine Learning (cs.LG), arXiv 1404.0736 [cs.CV], pp. 1-11(Jun. 9, 2014), url=https://arxiv.org/pdf/1404.0736.pdf, Jun. 9, 2014, URL, https://arxiv.org/pdf/1404.0736.pdf.
Japanese Office Action, Japanese Application No. 2019-048407, dated Oct. 18, 2022, English translation included, 8 pages.
Aravind Vasudevan et al., "Parallel multi channel convolution using general matrix multiplication," 2017, 2017 IEEE 28th International Conference on Application-specific systems, architectures and processors, 6 pages (Year: 2017).
Sanjay Ghosh et al., "On fast bilateral filtering using fourier kernels," 2016, IEEE Signal Processing Letters, vol. 23, No. 5, pp. 570-574, 5 pages (Year: 2016).
Kenjiro Sugimoto et al., "Compressive Bilateral Filtering," 2015, IEEE Transactions on Image Filtering, vol. 24, No. 11, pp. 3357-3369, 13 pages (Year: 2015).
Anthony Tompkins et al., "Fourier feature approximations for periodic kernels in time-series modelling," 2018, Thirty-Second AAAI Conference on Artificial Intelligence, pp. 4155-4162, 8 pages (Year: 2018).
Max Jaderberg et al., "Speeding up Convolutional Neural Networks with Low Rank Expansions," 2014, University of Oxford, pp. 1-13, 13 pages (Year: 2014).
Tristan A. Hearn et al., "Fast computation of convolution operations via low-rank approximation," 2014, Applied Numerical Mathematics, vol. 75, pp. 136-153, 18 pages (Year: 2014).
United States Office Action dated Nov. 28, 2022 issued in corresponding U.S. Appl. No. 16/809,050 (58 pages).

* cited by examiner

ACOUSTIC SIGNAL PROCESSING DEVICE, ACOUSTIC SIGNAL PROCESSING METHOD, AND PROGRAM FOR DETERMINING A STEERING COEFFICIENT WHICH DEPENDS ON ANGLE BETWEEN SOUND SOURCE AND MICROPHONE

CROSS-REFERENCE TO RELATED APPLICATION

Priority is claimed on Japanese Patent Application No. 2019-048406, filed Mar. 15, 2019, the content of which is incorporated herein by reference.

BACKGROUND OF THE INVENTION

Field of the Invention

The present invention relates to an acoustic signal processing device, an acoustic signal processing method, and a program.

Description of Related Art

There is a device that acquires an acoustic signal from a fixed sound source while a movable body equipped with a microphone is moving. In an actual environment, noise levels, frequency characteristics, and the like fluctuate every moment. Use of correlation matrices of a limited number of noises acquired in advance or acoustic feature quantities of each type of sound source may fail to eliminate the influence of noise. Therefore, it is difficult to accurately estimate the direction of a target sound in a real environment.

On the other hand, for example, a technique described in Japanese Unexamined Patent Application, First Publication No. 2014-56181 (hereinafter, Patent Document 1) accurately estimates the direction of a target sound since it uses a spatial spectrum calculated based on a correlation matrix relating to an input acoustic signal and correlation matrices of noise signals sequentially obtained.

Devices that process such acoustic signals process transfer functions between the sound source and the microphone using steering vectors.

SUMMARY OF THE INVENTION

When simulating an acoustic signal when at least one of a sound source and a microphone is moving, it is necessary to prepare a steering vector for each discrete time (a steering vector database). However, in the related art, the amount of calculation of the steering vector for each discrete time is great and the calculation requires time.

Aspects according to the present invention have been made in view of the above problems and it is an object of the present invention to provide an acoustic signal processing device, an acoustic signal processing method, and a program which can reduce the amount of calculation when calculating a signal that a microphone receives when at least one of a sound source and the microphone is moving.

To achieve the above object, the present invention adopts the following aspects.

(1) An acoustic signal processing device according to an aspect of the present invention calculates a signal waveform that a microphone receives when at least one of a sound source and the microphone is moving and includes a coefficient calculation unit configured to model a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more, and a recording signal calculation unit configured to calculate the signal waveform that the microphone receives using the modeled steering coefficient $g_{k,m}$.

(2) In the above aspect (1), k may represent a discrete time defined through discretization, $\theta_k$ may represent an angle between the sound source and the microphone at the discrete time, $\exp(in\theta_k)$ may be an nth-order Fourier basis function, and $c_{n,m}$ may be Fourier coefficients, the acoustic signal processing device may further include a storage unit configured to store the Fourier basis function, and the coefficient calculation unit may be configured to calculate the steering coefficient $g_{k,m}$ using the following equation:

$$g_{k,m} = \sum_{n=-N}^{N} c_{n,m} \exp(in\theta_k)$$

(3) In the above aspect (2), the recording signal calculation unit may be configured to calculate a recording waveform y that the microphone receives by multiplying a matrix of the Fourier basis functions of K rows and 2N+1 columns by a matrix of the Fourier coefficients of 2N+1 rows and M columns.

(4) In the above aspect (2) or (3), the recording signal calculation unit may be configured to select N such that (M+K)(2N+1) is less than (M×K).

(5) An acoustic signal processing method according to an aspect of the present invention calculates a signal waveform that a microphone receives when at least one of a sound source and the microphone is moving and includes a coefficient calculation process in which a coefficient calculation unit models a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more, and a recording signal calculation process in which a recording signal calculation unit calculates the signal waveform that the microphone receives using the modeled steering coefficient $g_{k,m}$.

(6) A non-transitory computer-readable storage medium according to an aspect of the present invention stores a program causing a computer for an acoustic signal processing device that calculates a signal waveform that a microphone receives when at least one of a sound source and the microphone is moving to execute a coefficient calculation process of modeling a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more, and a recording signal calculation process of calculating the signal waveform that the microphone receives using the modeled steering coefficient $g_{k,m}$.

According to the above aspect (1), (5) or (6), the amount of calculation of transfer characteristics can be reduced since the steering coefficient is modeled using N-order Fourier series expansion where N is an integer of 1 or more.

According to the above aspects (2) and (3), the amount of calculation of steering coefficients can be reduced by calculating the Fourier coefficients using the above equation.

According to the above aspect (4), the amount of calculation of steering coefficients can be reduced as compared with the related art since N is selected such that $(M+K)(2N+1)$ is less than $(M \times K)$.

DETAILED DESCRIPTION OF THE INVENTION

Figure 1:
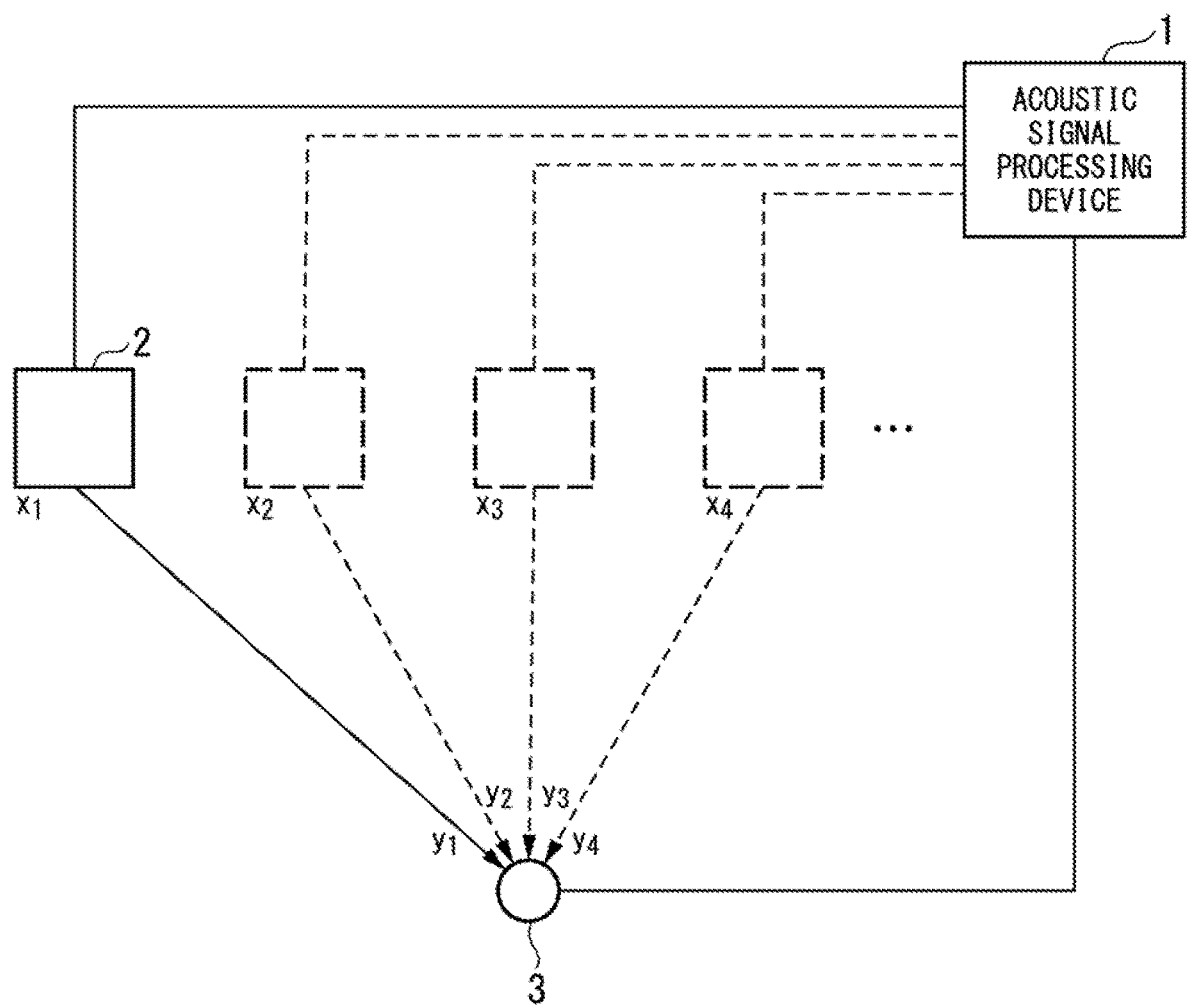
FIG. 1 is a diagram showing an example in which a microphone is fixed and a sound source is moving.

Hereinafter, embodiments of the present invention will be described with reference to the drawings. In the drawings used in the following description, the scale of each member is appropriately changed such that each member has a recognizable size.

Figure 2:
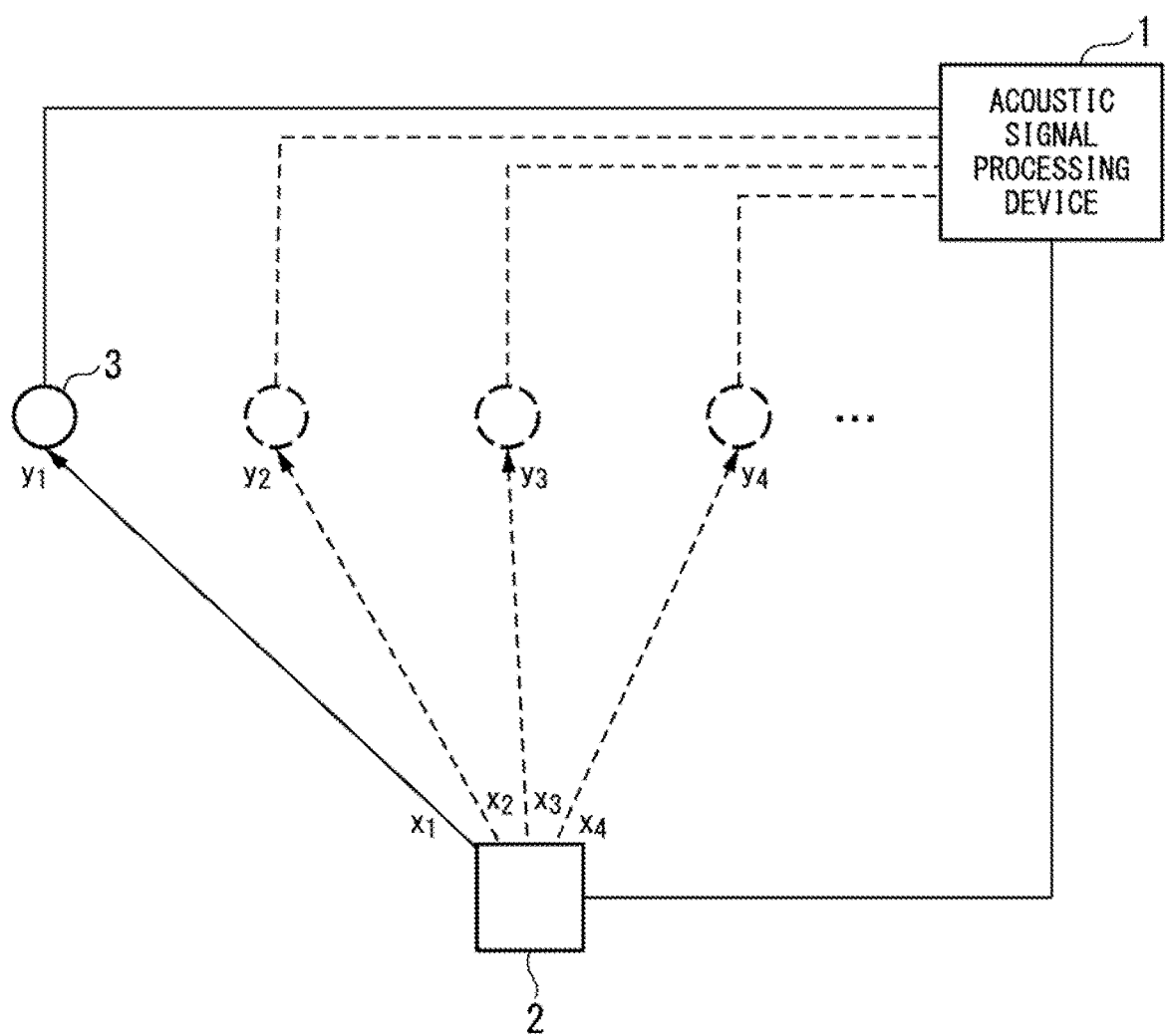
FIG. 2 is a diagram showing an example in which the sound source is fixed and the microphone is moving.
Figure 3:
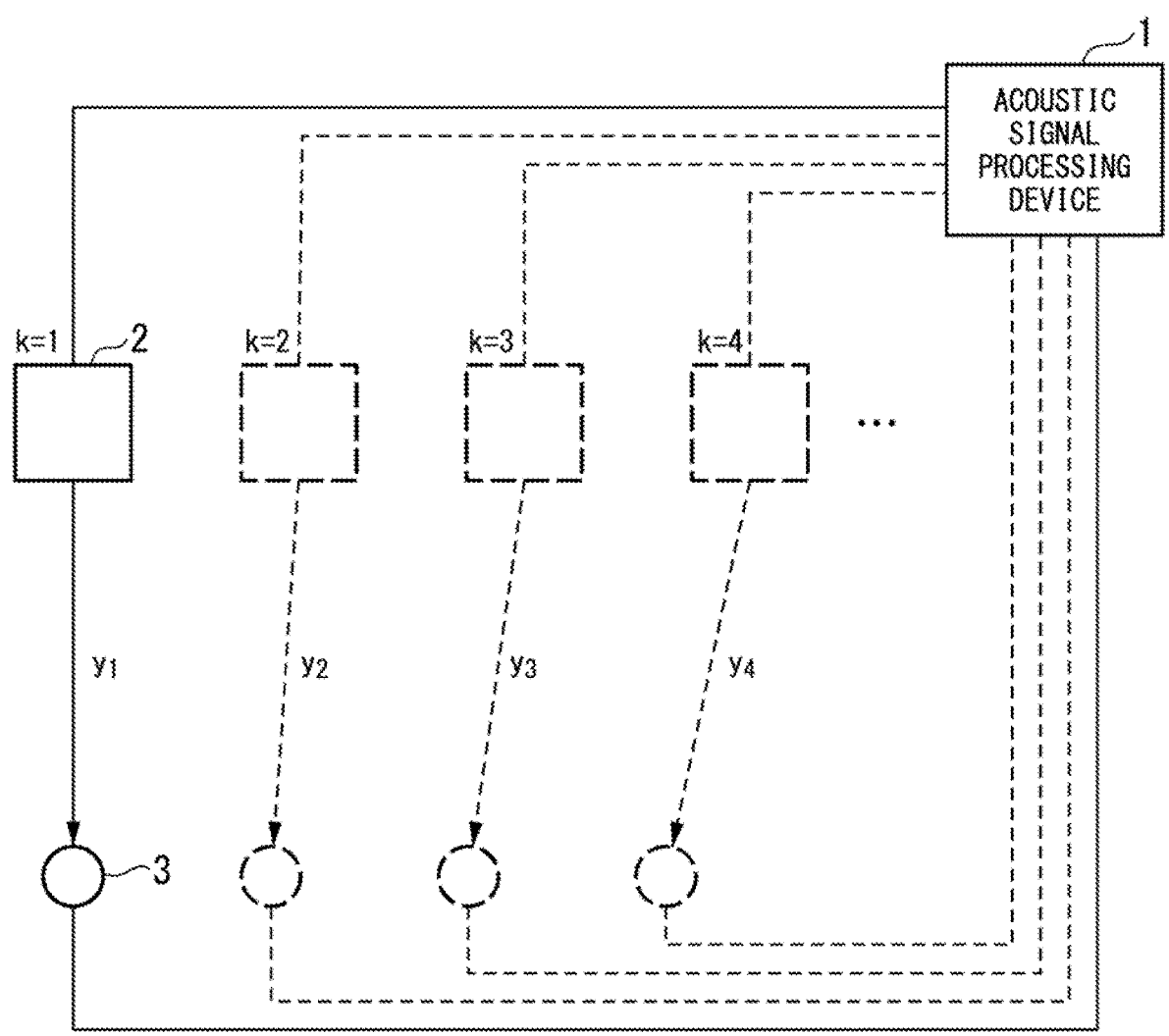
FIG. 3 is a diagram showing an example in which both the sound source and the microphone are moving.

FIG. 1 is a diagram showing an example in which a microphone 3 is fixed and a sound source 2 is moving. FIG. 2 is a diagram showing an example in which the sound source 2 is fixed and the microphone 3 is moving. FIG. 3 is a diagram showing an example in which both the sound source 2 and the microphone 3 are moving.

In FIGS. 1 to 3, a symbol $x_1$ represents a signal waveform that the sound source 2 emits through the acoustic signal processing device 1 at an mth discrete time of m=1. Hereinafter, a symbol $x_m$ represents a signal waveform that the sound source 2 emits at an mth discrete time. A symbol $y_1$ represents a recording waveform that the microphone 3 receives at a kth discrete time of k=1. Hereinafter, a symbol $y_k$ represents a recording waveform that the microphone 3 receives at a kth discrete time.

In the present embodiment, scalar values in the frequency domain are represented by uppercase letters (for example, Y and X) and scalar values in the time domain are represented by lowercase letters (for example, y and x).

In the case of a moving sound source, that is, when the microphone 3 is fixed and the sound source 2 is moving, the sound source 2 can be considered as a different sound source 2 at each time as shown in FIG. 1.

In the case of a moving microphone, that is, when the sound source 2 is fixed and the microphone 3 is moving, the microphone 3 can be considered as a different microphone 3 at each time as shown in FIG. 2.

In the case of a moving sound source and a moving microphone, that is, when both the sound source 2 and the microphone 3 are moving, the sound source 2 can be considered as a different sound source 2 at each time and the microphone 3 can be considered as a different microphone 3 at each time as shown in FIG. 3.

[Configuration of Acoustic Signal Processing Device]

Next, an example configuration of an acoustic signal processing device will be described.

Figure 4:
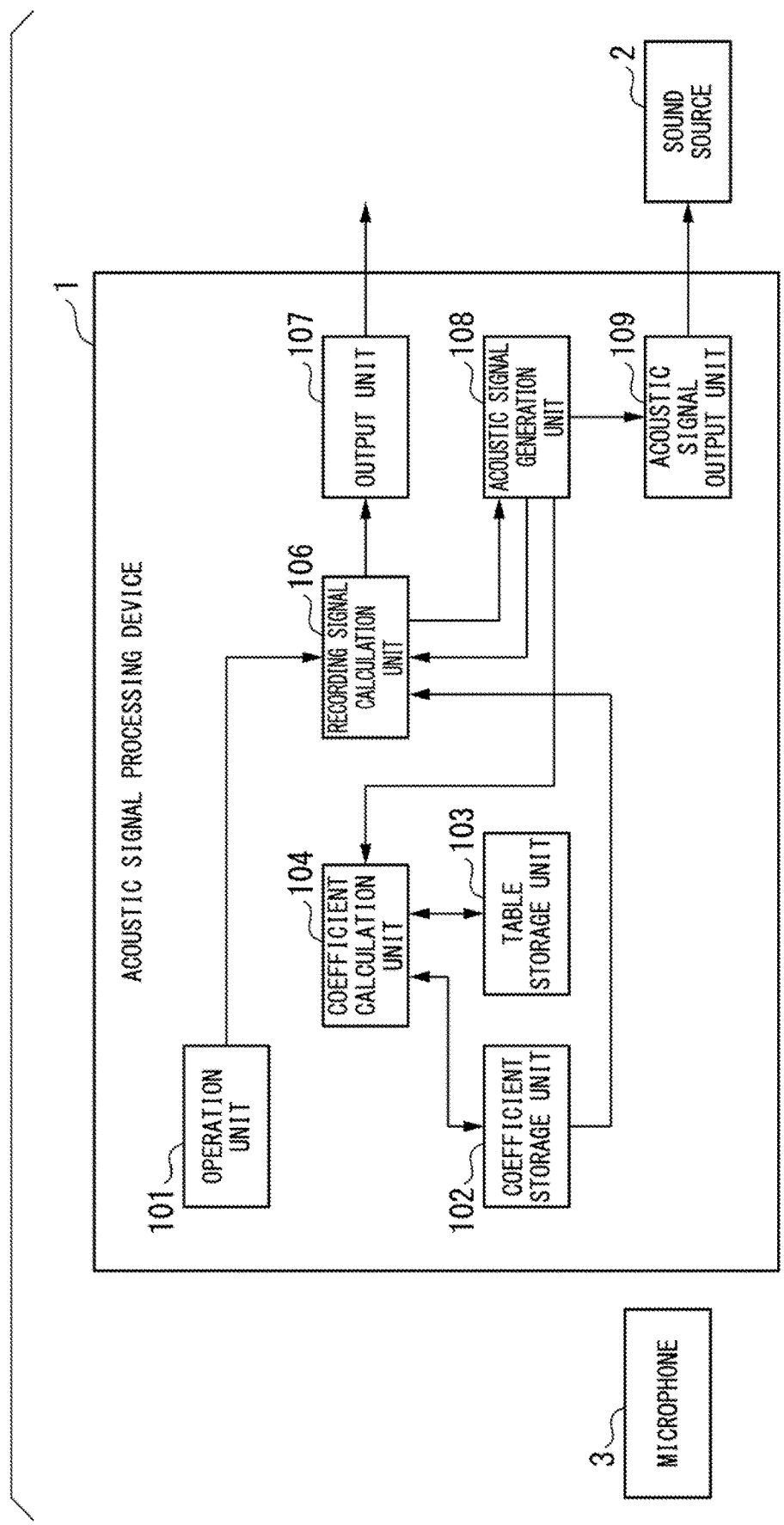
FIG. 4 is a block diagram showing an example configuration of an acoustic signal processing device according to an embodiment.

FIG. 4 is a block diagram showing an example configuration of an acoustic signal processing device 1 according to the present embodiment. As shown in FIG. 4, the acoustic signal processing device 1 includes an operation unit 101, a coefficient storage unit 102, a table storage unit 103 (storage unit), a coefficient calculation unit 104, a recording signal calculation unit 106, an output unit 107, an acoustic signal generation unit 108, and an acoustic signal output unit 109.

The acoustic signal processing device 1 calculates, using a Fourier coefficient model, steering coefficients used to calculate a recording waveform that the microphone 3 receives when at least one of the sound source 2 and the microphone 3 is moving.

The operation unit 101 detects a result of an operation performed by a user and outputs the detected operation result to the recording signal calculation unit 106. The operation unit 101 is, for example, a touch panel sensor, a keyboard, or a mouse. The operation result includes, for example, information indicating that the sound source 2 is moving or information indicating that the microphone 3 is moving.

The coefficient storage unit 102 stores the steering coefficients calculated by the coefficient calculation unit 104.

The table storage unit 103 stores, in a table format, values necessary for the coefficient calculation unit 104 to calculate the steering coefficients.

The coefficient calculation unit 104 calculates steering coefficients using an acoustic signal output by the acoustic signal generation unit 108 and values stored in the table storage unit 103 and causes the coefficient storage unit 102 to store the calculated steering coefficients.

The recording signal calculation unit 106 acquires the operation result output by the operation unit 101. The recording signal calculation unit 106 also acquires the acoustic signal output by the acoustic signal generation unit 108. The recording signal calculation unit 106 calculates (simulates) a recording waveform that the microphone 3 receives using the acoustic signal and the steering coefficients stored in the coefficient storage unit 102 on the basis of the operation result. The recording signal calculation unit 106 outputs the calculation result to the output unit 107 and the acoustic signal generation unit 108.

The output unit 107 outputs the calculation result output by the recording signal calculation unit 106 to an external device (for example, an image display device or a speaker).

The acoustic signal generation unit 108 generates an acoustic signal to be reproduced from the sound source. The acoustic signal generation unit 108 may correct or generate an acoustic signal to be reproduced on the basis of the calculation result of the recording signal calculation unit 106. The acoustic signal generation unit 108 outputs the generated acoustic signal to the acoustic signal output unit 109.

The acoustic signal output unit 109 is connected to the sound source 2. The acoustic signal output unit 109 may include an amplifier circuit. The acoustic signal output unit 109 may be connected to the sound source 2 by wire or wirelessly. When the acoustic signal output unit 109 is connected to the sound source 2 by wire, the acoustic signal output unit 109 outputs an output signal as an analog signal. When the acoustic signal output unit 109 is wirelessly connected to the sound source 2, the acoustic signal output unit 109 outputs an output signal as a digital signal. When the sound source 2 is wirelessly connected to the acoustic signal processing device 1, the sound source 2 includes a digital to analog (DA) converter that converts a digital signal into an analog signal. The sound source 2 is a speaker.

[Calculation of Transfer Characteristics in General Sound Field Processing]

In the following description, recording signals in a general case where the sound source and the microphone are moving will be described.

Figure 5:
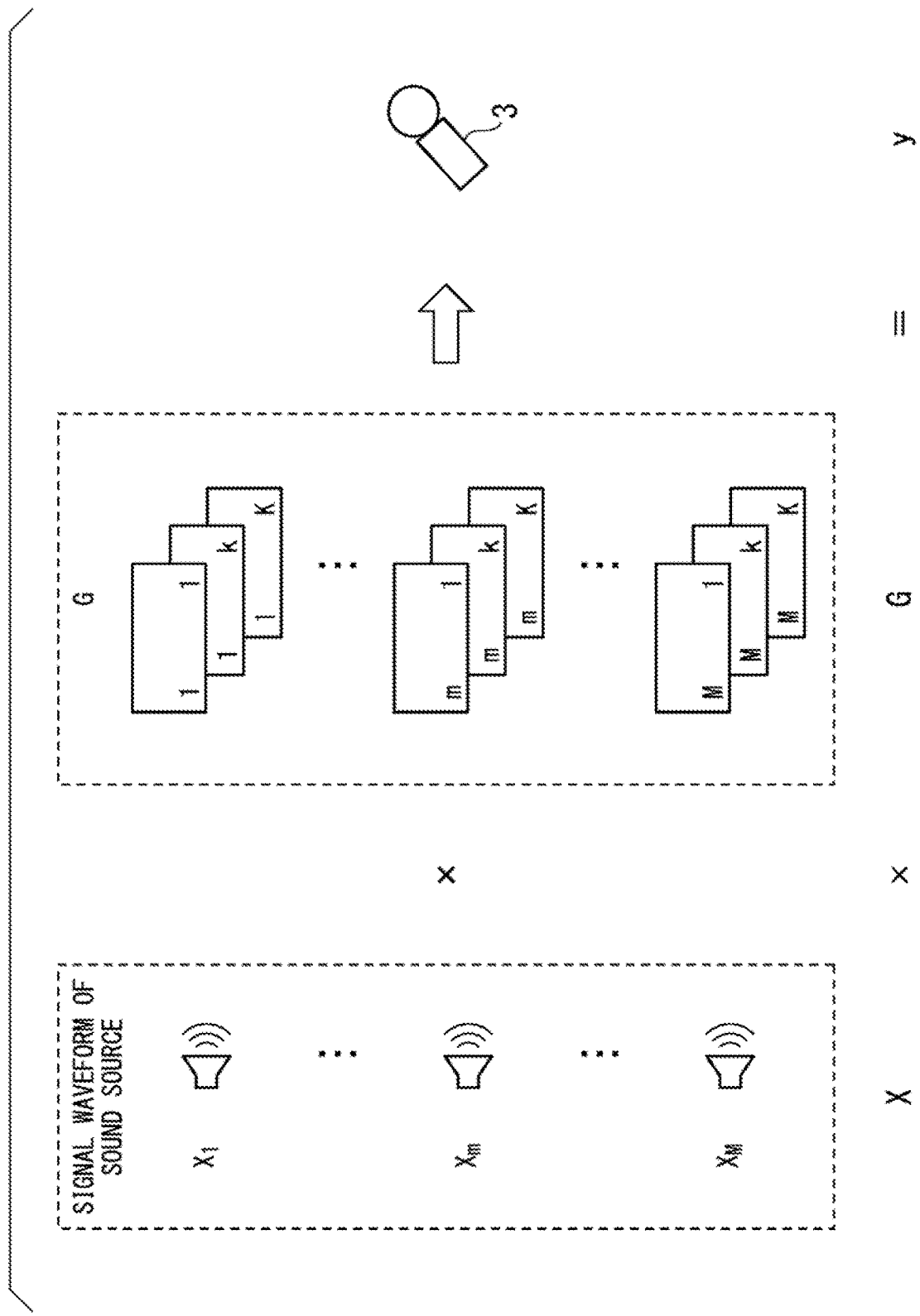
FIG. 5 is a diagram illustrating calculation of a recording waveform (recording signal) that the microphone receives in a general case where a sound source and a microphone are moving in the related art.

FIG. 5 is a diagram illustrating calculation of a recording waveform (recording signal) that the microphone receives in a general case where the sound source and the microphone are moving in the related art. In FIG. 5, some suffixes are omitted.

The signal waveform x of the sound source 2 and the recording waveform y of the microphone 3 can be calculated by the following equation (1). Here, x and y are vectors in the time domain.

$$y = Gx \quad \ldots \quad (1)$$

In equation (1), G is a coefficient matrix in the time domain.

Equation (1) can be expressed as the following equation (2).

$$\begin{bmatrix} y_1 \\ y_2 \\ \vdots \\ y_K \end{bmatrix} = \begin{bmatrix} g_{1,1} & \cdots & g_{1,M} \\ \vdots & \ddots & \vdots \\ g_{K,1} & \cdots & g_{K,M} \end{bmatrix} \begin{bmatrix} x_1 \\ x_2 \\ \vdots \\ x_M \end{bmatrix} \quad (2)$$

In equation (2), $x_m$ (m=1, 2, 3, . . . , M) is the signal waveform in the time domain when the sound source is moving and $y_k$ (k=1, 2, 3, . . . , K) is the recording waveform in the time domain when the microphone is moving. Here, m is the discrete time on the sound source side and M is the length of the signal of the sound source. k is the discrete time on the sound receiving side and K is the length of the recording signal. A coefficient $g_{k,m}$ represents how much the amplitude of a sound source signal emitted at the mth discrete time is transferred to the amplitude of a signal received at the kth discrete time.

Here, let the coordinates of the sound source at the mth discrete time be $r_x(m)$ and the coordinates of a sound receiving point at the kth discrete time be $r_y(k)$. Further, when an impulse response from $r_x(m)$ to $r_y(k)$ is represented by h(t, $r_x(m)$, $r_y(k)$) where t is a discrete time, $g_{k,m}$ is represented as the following equation (3).

$$g_{k,m} = h(k-m, r_x(m), r_y(k)) \quad \ldots \quad (3)$$

In equation (3), $h_{k,m}$ becomes 0 at the time of k−m<0 due to causality.

The coefficient matrix G having $g_{k,m}$ as elements for the sound source 2 and the microphone 3 that are moving often has values in a regular pattern. Therefore, the use of a Fourier coefficient model is highly likely to enable approximation at a low order and is thus effective.

Figure 6:
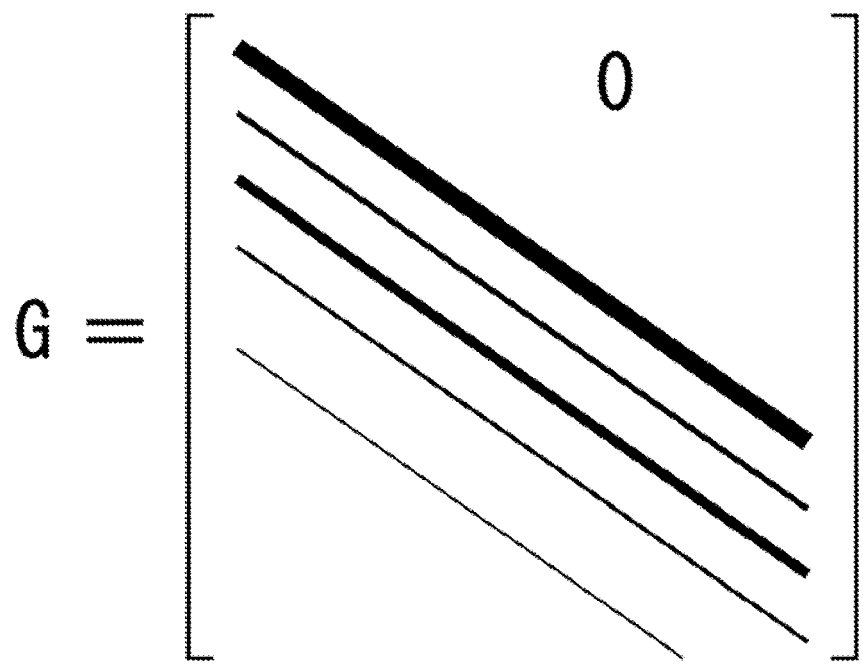
FIG. 6 is a diagram illustrating a coefficient matrix G for a moving sound source and microphone according to the embodiment.

FIG. 6 is a diagram illustrating a coefficient matrix G for a moving sound source and microphone according to the present embodiment. In FIG. 6, the thickness of a line indicates the magnitudes of the amplitudes of impulse responses.

When changes in the relative position between the sound source 2 and the microphone 3 are small, the coefficient matrix G has lines of almost the same values arranged at 45 degrees as shown in FIG. 6.

When the sound source 2 and the microphone 3 approach each other, the oblique lines become closer to horizontal lines. When the sound source 2 and the microphone 3 move away from each other, the oblique lines become closer to vertical lines. Even when the impulse responses themselves have changed, the basic pattern is as described above while only the shading of the lines fluctuates.

The above equation (2) is a matrix with K rows and M columns.

Therefore, the number of multiplications required to calculate the recording waveform that the microphone 3 receives using equation (2) is MK. For example, the number of multiplications required when M=72 and K=32 is 2304 (=72×32).

[Calculation of Transfer Characteristics According to Present Embodiment]

Next, a method of calculating transfer characteristics according to the present embodiment will be described.

In the present embodiment, the coefficient calculation unit 104 models the steering coefficients $g_m(\theta_k)$ using N-order complex Fourier coefficients as in the following equation (4). The steering coefficients $g_m(\theta_k)$ are steering coefficients for each microphone 3. The steering coefficients $g_m(\theta_k)$ are represented by $g_{k,m}$ in the notation in the matrix. In equation (6), k (where k is an integer from 1 to K) is a discrete time defined through discretization. $\theta_k$ represents an angle between the sound source and the microphone at the discrete time.

$$g_{k,m} = \sum_{n=-N}^{N} c_{n,m} \exp(in\theta_k) \quad (4)$$

In equation (4), $c_{n,m}$ are Fourier coefficients and i indicates an imaginary unit. Further, $c_{n,m}$ and $c_{-n,m}$ have a conjugate relationship with each other. $\exp(in\theta k)$ is an nth-order Fourier basis function and the calculation of the nth-order Fourier basis function is a process of only referring to a table prepared in advance. The table of $\exp(in\theta_k)$ is stored in the table storage unit 103 in advance.

[How to Obtain Coefficients]

Here, a method of determining a coefficient ($c_n(\omega)$) when a complex amplitude model given by equation (4) is introduced for a one-dimensional steering coefficient $g(\theta_k)$ with only the angle $\theta_k$ as a variable will be described as an example.

If the number of transfer functions measured is L and the corresponding discrete time is l(l=1, 2, 3, . . . , L), the following set of simultaneous equations (5) are obtained.

$$g(\theta_1) = \sum_{n=-N}^{N} c_n \exp(in\theta_1) \quad (5)$$

$$g(\theta_2) = \sum_{n=-N}^{N} c_n \exp(in\theta_2)$$

$$g(\theta_L) = \sum_{n=-N}^{N} c_n \exp(in\theta_L)$$

This set of simultaneous equations can be described using a matrix and vectors as in the following equation (6).

$$g = Ac \quad \ldots \quad (6)$$

In equation (6), c is a coefficient vector and A is a coefficient vector of the model. The vectors and matrix is represented by the following equations (7) to (9).

$$g = [g(\theta_1) g(\theta_2) \ldots g(\theta_L)]^T \ldots \quad (7)$$

$$c = [c_{-N} c_{-N+1} \ldots c_{-1} c_0 c_1 \ldots c_N]^T \ldots \quad (8)$$

$$A = [a1^T a2^T \ldots al \ldots aL^T]^T \ldots \quad (9)$$

In the equation (9), al is given by the following equation (10).

$$al = [\exp(-iN\theta_l) \ldots \exp(-i(N-1)\theta_l) \ldots \exp(-i\theta_l) \\ l \exp(i\theta_l) \ldots \exp(iN\theta_l)]^T \ldots \quad (10)$$

From equation (10), the coefficient vector c to be determined can be obtained as the following equation (11).

$$c = A^+ g \ldots \quad (11)$$

In equation (11), $A^+$ is a pseudo-inverse matrix of A (Moore-Penrose type pseudo-inverse matrix). According to equation (11), in general, when the number L of simultaneous equations is greater than the number 2N+1 of variables (when L>2N+1), the coefficient vector is obtained as a solution that minimizes the sum of squares of errors. Otherwise (when L≤2N+1), the coefficient vector is obtained as a solution that minimizes the norm of the solution of equation (2).

Next, the recording waveform $y_k$ at the microphone 3 can be calculated as in the following equation (12).

$$y_k = \sum_{m=1}^{M} x_m \left\{ \sum_{n=-N}^{N} c_{n,m} \cdot \exp(in\theta_k) \right\} \quad (12)$$

$$= \sum_{m=1}^{M} \sum_{n=-N}^{N} \{x_m c_{n,m} \cdot \exp(in\theta_k)\}$$

$$= \sum_{n=-N}^{N} \sum_{n=-N}^{N} \{x_m c_{n,m} \cdot \exp(in\theta_k)\}$$

$$= \sum_{n=-N}^{N} \exp(in\theta_k) \sum_{n=-N}^{N} x_m c_{n,m}$$

Equations (2) and (12) are represented by matrix·vector as in the following equation (13).

$$\begin{bmatrix} g_1(\theta_1) & \cdots & g_M(\theta_1) \\ \vdots & \ddots & \vdots \\ g_1(\theta_K) & \cdots & g_M(\theta_K) \end{bmatrix} = \begin{bmatrix} \exp(-iN\theta_1) & \cdots & \exp(-iN\theta_1) \\ \vdots & \ddots & \vdots \\ \exp(-iN\theta_K) & \cdots & \exp(-iN\theta_K) \end{bmatrix} \begin{bmatrix} c_{1,-N} & \cdots & c_{M,-N} \\ \vdots & \ddots & \vdots \\ c_{1,N} & \cdots & c_{M,N} \end{bmatrix} \quad (13)$$

In equation (13), the left side has K rows and M columns. The first term on the right side is Fourier basis functions, the number of rows thereof is K, and the number of columns is 2N+1 (the number of Fourier series). The second term on the right side is Fourier coefficients, the number of rows thereof is 2N+1 (the number of Fourier series), and the number of columns is M.

Here, it is assumed that equation (13) is g=Sc.

In the case of calculation using the Fourier model, the recording waveform $y_k$ in the time domain that the microphone 3 receives can be expressed as $y_k$=gx=Scx=S(cx).

Here, S is a matrix of K rows and 2N+1 columns as in equation (13) and requires K(2N+1) multiplications. c is a matrix of 2N+1 rows and M columns as in equation (13) and requires (2N+1)M multiplications. Therefore, the total number of multiplications in equation (13) is (M+K)(2N+1).

The coefficient calculation unit 104 may select N such that (M+K)(2N+1) is less than (M×K). Thus, according to the present embodiment, the amount of calculation of steering coefficients can be reduced as compared with the related art.

[Processing Procedure]

Next, an example of a processing procedure of the acoustic signal processing device 1 will be described.

Figure 7:
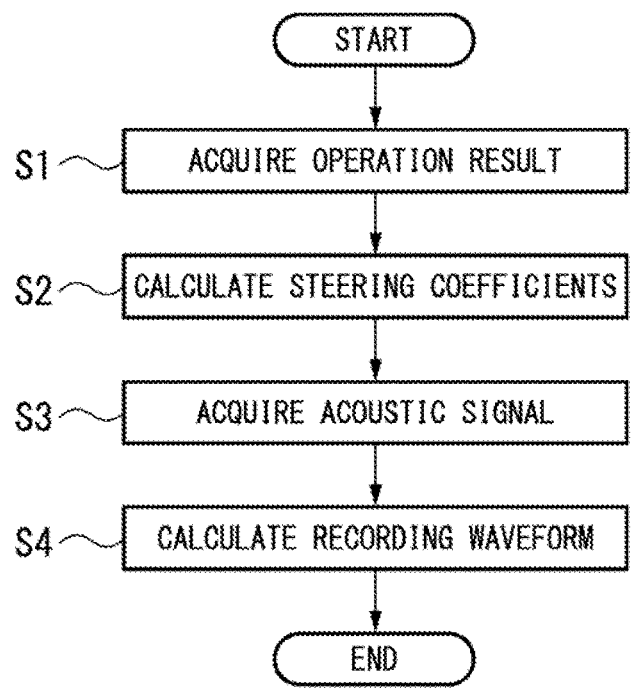
FIG. 7 is a flowchart of a process performed by the acoustic signal processing device according to the embodiment.

FIG. 7 is a flowchart of a process performed by the acoustic signal processing device 1 according to the present embodiment.

(Step S1) The operation unit 101 acquires a result of an operation performed by the user.

(Step S2) The coefficient calculation unit 104 calculates steering coefficients for an acoustic signal generated by the acoustic signal generation unit 108 using values (the table of $\exp(in\theta_k)$) stored in the table storage unit 103 on the basis of the operation result. Subsequently, the coefficient calculation unit 104 causes the coefficient storage unit 102 to store the calculated steering coefficients.

(Step S3) The recording signal calculation unit 106 acquires the acoustic signal generated by the acoustic signal generation unit 108.

(Step S4) The recording signal calculation unit 106 calculates, for the acquired acoustic signal, a recording waveform that the microphone 3 receives using the steering coefficients stored in the coefficient storage unit 102.

In the modeling with N-order Fourier coefficients, other methods such as Taylor expansion and spline interpolation may be used without being limited to Fourier series expansion.

As described above, according to the present embodiment, the amount of calculation of steering coefficients can be reduced since steering coefficients are modeled using N-order Fourier series expansion (where N is an integer of 1 or more). According to the present embodiment, the amount of data stored in the coefficient storage unit 102 can also be reduced as compared with the related art since the modeling is performed using N-order Fourier series expansion (where N is an integer of 1 or more).

All or some of the processes performed by the acoustic signal processing device 1 according to the present invention may be performed by recording a program for realizing all or some of the functions of the acoustic signal processing device 1 according to the present invention on a computer readable recording medium and causing a computer system to read and execute the program recorded on the recording medium. The "computer system" referred to here includes an OS or hardware such as peripheral devices. The "computer system" also includes a WWW system including a website providing environment (or display environment). The "computer readable recording medium" refers to a portable medium such as a flexible disk, a magneto-optical disk, a ROM, or a CD-ROM or a storage device such as a hard disk provided in a computer system. The "computer readable recording medium" includes one that holds the program for a certain period of time, like a volatile memory (RAM) provided in a computer system which serves as a server or a client when the program has been transmitted via a network such as the Internet or a communication line such as a telephone line.

The program may also be transmitted from a computer system in which the program is stored in a storage device or the like to another computer system via a transmission medium or by transmission waves in the transmission medium. Here, the "transmission medium" for transmitting the program refers to a medium having a function of transmitting information, like a network (a communication network) such as the Internet and a communication line (a communication wire) such as a telephone line. The program may be one for realizing some of the above-described functions. The program may also be a so-called differential file (differential program) which can realize the above-described functions in combination with a program already recorded in the computer system.

Although the modes for carrying out the present invention have been described above by way of embodiments, the present invention is not limited to these embodiments at all and various modifications and substitutions can be made without departing from the gist of the present invention.

What is claimed is:

1. An acoustic signal processing device that calculates a signal waveform that a microphone receives when at least one of a sound source and the microphone is moving, the acoustic signal processing device comprising:
    a coefficient calculation unit configured to model a steering coefficient g k,m representing how much an amplitude of a sound source signal emitted at an mth discrete time, where m is an integer between 1 and M and M Is a length of the sound source signal, is transferred to an amplitude of a signal that the microphone receives at a kth discrete time, where k is an integer between 1 and K and K is a length of a recording signal, using N-order Fourier series expansion where N is an integer of 1 or more; and
    a recording signal calculation unit configured to calculate the signal waveform that the microphone receives using the modeled steering coefficient $g_{k,m}$,
    wherein k represents a discrete time defined through discretization, $\theta_k$ represents an angle between the sound source and the microphone at the discrete time, exp $(in\theta_k)$ is an nth-order Fourier basis function, and $C_{n,m}$ is Fourier coefficient,
    the acoustic signal processing device further comprises a storage unit configured to store the Fourier basis function, and
    the coefficient calculation unit is configured to calculate the steering coefficient $g_{k,m}$ using the following equation:

$$g_{k,m} = \sum_{n=-N}^{N} c_{n,m} \exp(in\theta_k).$$

2. The acoustic signal processing device according to claim 1, wherein the recording signal calculation unit is configured to calculate a recording waveform y that the microphone receives by multiplying a matrix of the Fourier basis functions of K rows and 2N+1 columns by a matrix of the Fourier coefficients of 2N+1 rows and M columns.

3. The acoustic signal processing device according to claim 1, wherein the recording signal calculation unit is configured to select N such that (M+K)(2N+1) is less than (M×K).

4. An acoustic signal processing method that calculates a signal waveform that a microphone receives when at least one of a sound source and the microphone is moving, the acoustic signal processing method comprising:
    a coefficient calculation process in which a coefficient calculation unit models a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more; and
    a recording signal calculation process in which a recording signal calculation unit calculates the signal waveform that the microphone receives using the modeled steering coefficient $g_{k,m}$,
    wherein k represents a discrete time defined through discretization, $\theta_k$ represents an angle between the sound source and the microphone at the discrete time, exp $(in\theta_k)$ is an nth-order Fourier basis function, and $C_{n,m}$ is Fourier coefficient,
    the acoustic signal processing method further comprises storing the Fourier basis function in a storage unit, and
    the coefficient calculation process includes calculating the steering coefficient $g_{k,m}$ using the following equation:

$$g_{k,m} = \sum_{n=-N}^{N} C_{n,m} \exp(in\theta_k).$$

5. A non-transitory computer-readable storage medium that stores a program causing a computer for an acoustic signal processing device that calculates a signal waveform that a microphone receives when at least one of a sound source and the microphone is moving to execute:
    a coefficient calculation process of modeling a steering coefficient $g_{k,m}$ representing how much an amplitude of a sound source signal emitted at an mth discrete time, where m is an integer between 1 and M and M is a length of the sound source signal, is transferred to an amplitude of a signal that the microphone receives at a kth discrete time, where k is an integer between 1 and K and K is a length of a recording signal, using N-order Fourier series expansion where N is an integer of 1 or more;
    a recording signal calculation process of calculating the signal waveform that the microphone receives using the modeled steering coefficient $g_{km}$; and a storage process of storing Fourier basis functions in a storage unit of the acoustic signal processing device, wherein k represents a discrete time defined through discretization, $\theta_k$ represents an angle between the sound source and the microphone at the discrete time, exp($in\theta_k$) is an nth-order Fourier basis function, and $c_{nm}$ is Fourier coefficient, and the coefficient calculation process includes calculating the steering coefficient $g_{k,m}$ using the following equation:

$$g_{k,m} = \sum_{n=-N}^{N} C_{n,m} \exp(in\theta_k).$$

* * * * *